United States Patent
Warkentin et al.

(10) Patent No.: US 12,182,602 B2
(45) Date of Patent: Dec. 31, 2024

(54) PROVISIONING DPU MANAGEMENT OPERATING SYSTEMS USING FIRMWARE CAPSULES

(71) Applicant: VMWARE, INC., Palo Alto, CA (US)

(72) Inventors: Andrei Warkentin, South Elgin, IL (US); Karthik Ramachandra, Bangalore (IN); Timothy P. Mann, Palo Alto, CA (US); Jared Mcneill, Quispamsis (CA); Sunil Kotian, San Jose, CA (US); Cyprien Laplace, Boston, MA (US); David A Dunn, Sammamish, WA (US)

(73) Assignee: VMware LLC, Palo Alto, CA (US)

( * ) Notice: Subject to any disclaimer, the term of this patent is extended or adjusted under 35 U.S.C. 154(b) by 462 days.

(21) Appl. No.: 17/704,040

(22) Filed: Mar. 25, 2022

(65) Prior Publication Data

US 2023/0229480 A1 Jul. 20, 2023

(30) Foreign Application Priority Data

Jan. 20, 2022 (IN) .............................. 202241003402

(51) Int. Cl.
*G06F 9/455* (2018.01)
(52) U.S. Cl.
CPC .................. *G06F 9/45558* (2013.01); *G06F 2009/45595* (2013.01)
(58) Field of Classification Search
CPC ....... G06F 9/45558; G06F 2009/45595; G06F 8/61; G06F 8/63
See application file for complete search history.

(56) References Cited

U.S. PATENT DOCUMENTS

| 9,146,748 | B1* | 9/2015 | Kumar ................. G06F 9/4411 |
| 2005/0193393 | A1* | 9/2005 | Fausak ................. G06F 9/4416 713/2 |
| 2008/0034364 | A1* | 2/2008 | Lam ....................... G06F 8/658 718/1 |
| 2008/0155245 | A1 | 6/2008 | Lipscombe et al. |

(Continued)

OTHER PUBLICATIONS

Cui Neo: "Using HTTP Boot to Install an Operating System on Lenovo ThinkSystem", May 31, 2019 (May 31, 2019), pp. 1-24, XP093034482, Retrieved from the Internet: URL:https://lenovopress.lenovo.com/lp0736.pdf [retrieved on Mar. 24, 2023] p. 1-p. 22.

(Continued)

*Primary Examiner* — Benjamin C Wu
(74) *Attorney, Agent, or Firm* — King Intellectual Asset Management (57) ABSTRACT

Disclosed are various examples of provisioning a data processing unit (DPU) management operating system using a capsule. A management hypervisor installer executed on a host device receives a listing DPU device from a baseboard management controller (BMC). A preinstalled DPU management operating system image is identified for a DPU device from the listing, and is wrapped with a capsule that specifies the capsule as a DPU management operating system image capsule. A server component provides the DPU management operating system image capsule at a particular URI, and the URI is transmitted to the BMC.

20 Claims, 4 Drawing Sheets

(56) References Cited

U.S. PATENT DOCUMENTS

| | | | | |
|---|---|---|---|---|
| 2010/0125856 A1* | 5/2010 | Dash | .................... | G06F 9/45545 |
| | | | | 719/321 |
| 2015/0120887 A1* | 4/2015 | Hu | ..................... | H04L 41/0895 |
| | | | | 709/220 |
| 2016/0253160 A1* | 9/2016 | Alger | ..................... | H04L 67/34 |
| | | | | 717/177 |
| 2018/0157494 A1* | 6/2018 | Dunham | ................. | G06F 13/24 |
| 2020/0257521 A1* | 8/2020 | Jayakumar | ............ | G06F 21/572 |
| 2021/0224061 A1 | 7/2021 | Pillilli et al. | | |
| 2021/0240487 A1* | 8/2021 | Vidyadhara | ............. | G06F 12/06 |
| 2021/0365559 A1* | 11/2021 | Jayakumar | ............ | G06F 21/572 |
| 2022/0019426 A1* | 1/2022 | Song | ....................... | G06F 8/656 |
| 2023/0229480 A1* | 7/2023 | Warkentin | ................ | G06F 8/61 |
| | | | | 718/1 |
| 2023/0229481 A1* | 7/2023 | Warkentin | ............ | G06F 9/4401 |
| | | | | 718/1 |
| 2023/0259352 A1* | 8/2023 | Kazatsker | ............... | G06F 21/57 |
| | | | | 717/172 |
| 2024/0036848 A1* | 2/2024 | Suryanarayana | ......... | G06F 8/65 |
| 2024/0160431 A1* | 5/2024 | Kumar | ...................... | G06F 8/65 |
| 2024/0160740 A1* | 5/2024 | Morishige | ............ | G06F 9/4401 |

OTHER PUBLICATIONS

International Search Report and Written Opinion in PCT/US2023/010839 mailed Apr. 4, 2023.

* cited by examiner

PROVISIONING DPU MANAGEMENT OPERATING SYSTEMS USING FIRMWARE CAPSULES

RELATED APPLICATION

Benefit is claimed under 35 U.S.C. 119(a)-(d) to Foreign Application Serial No. 202241003402 filed in India entitled "PROVISIONING DPU MANAGEMENT OPERATING SYSTEMS USING FIRMWARE CAPSULES", on Jan. 20, 2022, by VMware, Inc., which is herein incorporated in its entirety by reference for all purposes.

The present application is related to commonly owned U.S. patent application Ser. No. 17/704,052, filed concurrently herewith and entitled "PROVISIONING DPU MANAGEMENT OPERATING SYSTEMS" The entire contents of this application are incorporated herein by reference for all purposes.

BACKGROUND

Management services can use hypervisors for deploying and serving virtualization solutions that use hardware resources of a host device to provide virtual devices such as virtual machines. The management service can then deploy workloads to the virtual devices on behalf of an enterprise that employs the management service. The workloads can be executed or performed using the hardware resources allocated to virtual devices and made available using the hypervisors installed on various host devices.

Data processing units (DPUs) can be physically installed to host devices. These DPUs can include processors, a network interface, and in many cases can include acceleration engines capable of machine learning, networking, storage, and artificial intelligence processing. The DPUs can include processing, networking, storage, and accelerator hardware. However, DPUs can be made by a wide variety of manufacturers. The interface and general operation can differ from DPU to DPU.

This can pose problems for management services and enterprises that desire to fully utilize the capabilities of DPUs in host devices. There is a need for better mechanisms that can integrate DPUs into a virtualization and management solution.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to provisioning data processing unit (DPU) management operating systems using capsules. The DPUs can be physically installed to host devices. The DPUs can include processors, a network interface, and in many cases can include acceleration engines capable of machine learning, networking, storage, and artificial intelligence processing. However, DPUs can be made by a wide variety of manufacturers. The interface and general operation can differ from DPU to DPU. This can pose problems for management services and enterprises that desire to fully utilize the capabilities of DPUs in host devices. The present disclosure describes mechanisms that can integrate DPUs into a virtualization and management solution by provisioning data processing unit DPU management operating systems using capsules.

Figure 1:
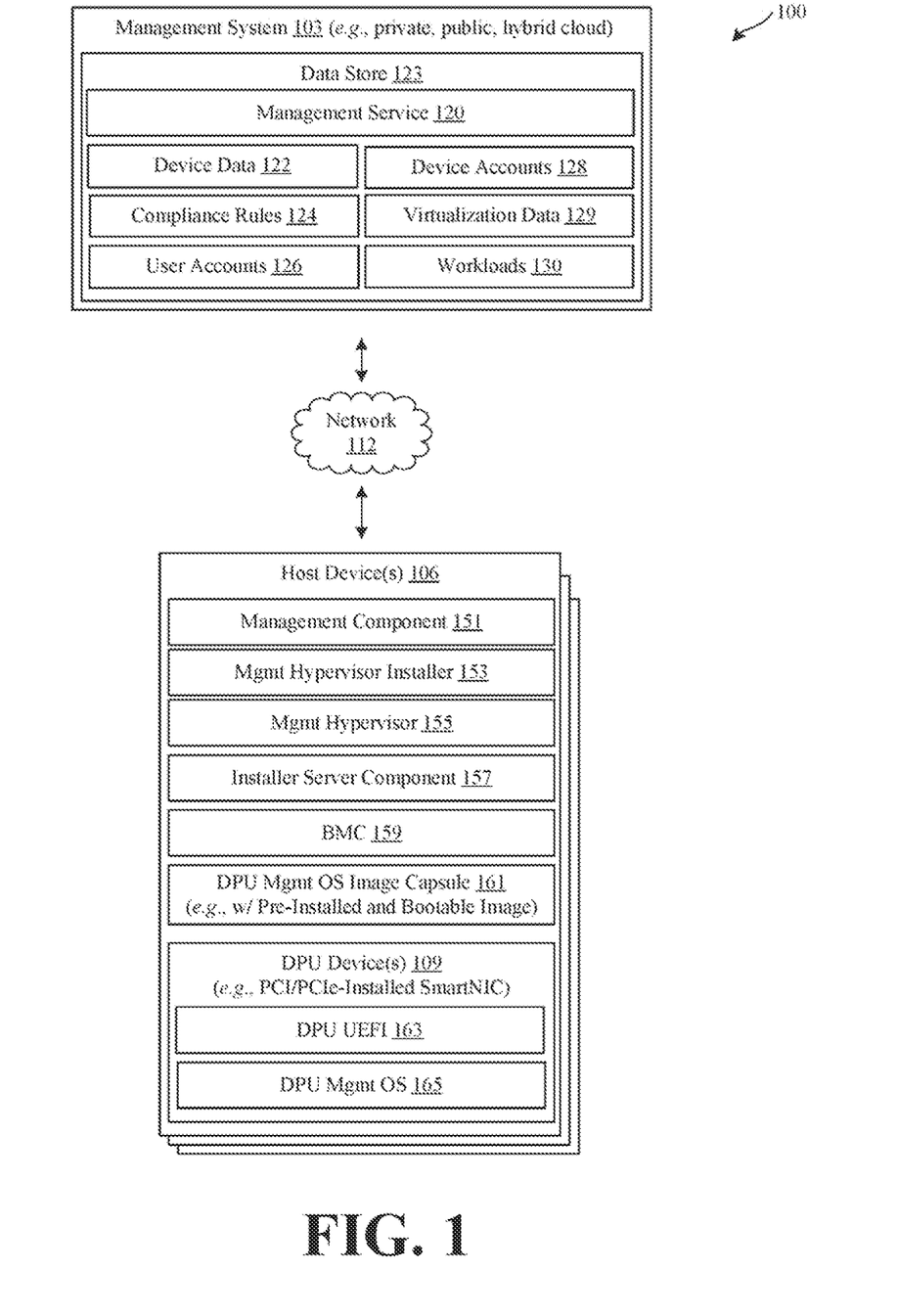
FIG. 1 is a drawing of an example of a networked environment that includes components that provision data processing unit (DPU) management operating systems using capsules, according to the present disclosure.

With reference to FIG. 1, shown is an example of a networked environment 100. The networked environment 100 can include a management system 103, host devices 106, and other components in communication with one another over a network 112. DPU devices 109 can be installed to the host devices 106. In some cases, host devices 106 can include computing devices or server computing devices of a private cloud, public cloud, hybrid cloud, and multi-cloud infrastructures. Hybrid cloud infrastructures can include public and private host computing devices. Multi-cloud infrastructures can include multiple different computing platforms from one or more service providers in order to perform a vast array of enterprise tasks.

The host devices 106 can also include devices that can connect to the network 112 directly or through an edge device or gateway. The components of the networked environment 100 can be utilized to provide virtualization solutions for an enterprise. The hardware of the host devices 106 can include physical memory, physical processors, physical data storage, and physical network resources that can be utilized by virtual machines. Host devices 106 can also include peripheral components such as the DPU devices 109. The host devices 106 can include physical memory, physical processors, physical data storage, and physical network resources. Virtual memory, virtual processors, virtual data storage, and virtual network resources of a virtual machine can be mapped to physical memory, physical processors, physical data storage, and physical network resources of the host devices 106. The management hypervisor 155 can provide access to the physical memory, physical processors, physical data storage, and physical network resources of the host devices 106 to perform workloads 130.

The DPU devices 109 can include networking accelerator devices, smart network interface cards, or other cards that are installed as a peripheral component. The DPU devices 109 themselves can also include physical memory, physical processors, physical data storage, and physical network resources. The DPU devices 109 can also include specialized physical hardware that includes accelerator engines for machine learning, networking, storage, and artificial intelligence processing. Virtual memory, virtual processors, virtual data storage, and virtual network resources of a virtual machine can be mapped to physical memory, physical processors, physical data storage, physical network resources, and physical accelerator resources of the DPU devices 109. The DPU management OS 165 can communicate with the management hypervisor 155 and/or with the management service 120 directly to provide access to the physical memory, physical processors, physical data storage, physical network resources, and physical accelerator resources of the DPU devices 109. However, the DPU management OS 165, or an up-to-date version of the DPU management OS 165 may not be initially installed to the DPU device 109.

Virtual devices including virtual machines, containers, and other virtualization components can be used to execute the workloads 130. The workloads 130 can be managed by the management service 120 for an enterprise that employs the management service 120. Some workloads 130 can be initiated and accessed by enterprise users through client devices. The virtualization data 129 can include a record of the virtual devices, as well as the host devices 106 and DPU devices 109 that are mapped to the virtual devices. The virtualization data 129 can also include a record of the workloads 130 that are executed by the virtual devices.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks.

The management system 103 can include one or more host or server computers, and any other system providing computing capability. In some examples, a subset of the host devices 106 can provide the hardware for the management system 103. While referred to in the singular, the management system 103 can include a plurality of computing devices that are arranged in one or more server banks, computer banks, or other arrangements. The management system 103 can include a grid computing resource or any other distributed computing arrangement. The management system 103 can be multi-tenant, providing virtualization and management of workloads 130 for multiple different enterprises. Alternatively, the management system 103 can be customer or enterprise-specific.

The computing devices of the management system 103 can be located in a single installation or can be distributed among many different geographical locations which can be local and/or remote from the other components. The management system 103 can also include or be operated as one or more virtualized computer instances. For purposes of convenience, the management system 103 is referred to herein in the singular. Even though the management system 103 is referred to in the singular, it is understood that a plurality of management systems 103 can be employed in the various arrangements as described above.

The components executed on the management system 103 can include a management service 120, as well as other applications, services, processes, systems, engines, or functionality not discussed in detail herein. The management service 120 can be stored in the data store 123 of the management system 103. While referred to generally as the management service 120 herein, the various functionalities and operations discussed can be provided using a management service 120 that includes a scheduling service and a number of software components that operate in concert to provide compute, memory, network, and data storage for enterprise workloads and data. The management service 120 can also provide access to the enterprise workloads and data executed by the host devices 106 and can be accessed using client devices that can be enrolled in association with a user account 126 and related credentials.

The management service 120 can communicate with associated management instructions executed by host devices 106, client devices, edge devices, and IoT devices to ensure that these devices comply with their respective compliance rules 124, whether the specific host device 106 is used for computational or access purposes. If the host devices 106 or client devices fail to comply with the compliance rules 124, the respective management instructions can perform remedial actions including discontinuing access to and processing of workloads 130.

The data store 123 can include any storage device or medium that can contain, store, or maintain the instructions, logic, or applications described herein for use by or in connection with the instruction execution system. The data store 123 can be a hard drive or disk of a host, server computer, or any other system providing storage capability. While referred to in the singular, the data store 123 can include a plurality of storage devices that are arranged in one or more hosts, server banks, computer banks, or other arrangements. The data store 123 can include any one of many physical media, such as magnetic, optical, or semiconductor media. More specific examples include solid-state drives or flash drives. The data store 123 can include a data store of the management system 103, mass storage resources of the management system 103, or any other storage resources on which data can be stored by the management system 103. The data store 123 can also include memories such as RAM used by the management system 103. The RAM can include static RAM (SRAM), dynamic RAM (DRAM), synchronous DRAM (SDRAM), and other types of RAM.

The data stored in the data store 123 can include management data including device data 122, enterprise data, compliance rules 124, user accounts 126, and device accounts 128, as well as other data. Device data 122 can identify host devices 106 by one or more device identifiers, a unique device identifier (UDID), a media access control (MAC) address, an internet protocol (IP) address, or another identifier that uniquely identifies a device with respect to other devices.

The device data 122 can include an enrollment status indicating whether each computing device is enrolled with or managed by the management service 120. For example, an end-user device, an edge device, IoT device, host device 106, client device, or other devices can be designated as "enrolled" and can be permitted to access the enterprise workloads and data hosted by host devices 106, while those designated as "not enrolled," or having no designation, can be denied access to the enterprise resources. The device data 122 can further include indications of the state of IoT devices, edge devices, end user devices, host device 106, and other devices. While a user account 126 can be associated with a particular person as well as client devices, a device account 128 can be unassociated with any particular person, and can nevertheless be utilized for an IoT device, edge device, or another client device that provides automatic functionalities.

Device data 122 can also include data pertaining to user groups. An administrator can specify one or more of the host devices 106 as belonging to a user group. The user group can refer to a group of user accounts 126, which can include device accounts 128. User groups can be created by an administrator of the management service 120.

Compliance rules 124 can include, for example, configurable criteria that must be satisfied for the host devices 106 and other devices to be in compliance with the management service 120. The compliance rules 124 can be based on a number of factors, including geographical location, activation status, enrollment status, and authentication data, including authentication data obtained by a device registration system, time, and date, and network properties, among other factors associated with each device. The compliance rules 124 can also be determined based on a user account 126 associated with a user.

Compliance rules 124 can include predefined constraints that must be met in order for the management service 120, or other applications, to permit host devices 106 and other devices access to enterprise data and other functions of the management service 120. The management service 120 can communicate with management instructions on the client device to determine whether states exist on the client device which do not satisfy one or more of the compliance rules 124. States can include, for example, a virus or malware being detected; installation or execution of a blacklisted application; and/or a device being "rooted" or "jailbroken," where root access is provided to a user of the device. Additional states can include the presence of particular files, questionable device configurations, vulnerable versions of applications, vulnerable states of the client devices or other vulnerability, as can be appreciated. While the client devices can be discussed as user devices that access or initiate workloads 130 that are executed by the host devices 106, all types of devices discussed herein can also execute virtualization components and provide hardware used to host workloads 130.

The management service 120 can oversee the management and resource scheduling using hardware provided using host devices 106. The management service 120 can transmit various software components, including enterprise workloads, enterprise data, and other enterprise resources for processing and storage using the various host devices 106. The host devices 106 can include host devices 106 such as a server computer or any other system providing computing capability, including those that compose the management system 103. Host devices 106 can include public, private, hybrid cloud and multi-cloud devices that are operated by third parties with respect to the management service 120. The host devices 106 can be located in a single installation or can be distributed among many different geographical locations which can be local and/or remote from the other components.

The host devices 106 can include DPU devices 109 that are connected to the host device 106 through a universal serial bus (USB) connection, a Peripheral Component Interconnect Express (PCI-e) or mini-PCI-e connection, or another physical connection. DPU devices 109 can include hardware accelerator devices specialized to perform artificial neural networks, machine vision, machine learning, and other types of special purpose instructions written using CUDA, OpenCL, C++, and other instructions. The DPU devices 109 can utilize in-memory processing, low-precision arithmetic, and other types of techniques. The DPU devices 109 can have hardware including a network interface controller (NIC), CPUs, data storage devices, memory devices, and accelerator devices.

The management service 120 can include a scheduling service that monitors resource usage of the host devices 106, and particularly the host devices 106 that execute enterprise workloads 130. The management service 120 can also track resource usage of DPU devices 109 that are installed on the host devices 106. The management service 120 can track the resource usage of DPU devices 109 in association with the host devices 106 to which they are installed. The management service 120 can also track the resource usage of DPU devices 109 separately from the host devices 106 to which they are installed.

In some examples, the DPU devices 109 can execute workloads 130 assigned to execute on host devices 106 to which they are installed. For example, the management hypervisor 155 can communicate with a DPU management OS 165 to offload all or a subset of a particular workload 130 to be performed using the hardware resources of a DPU device 109. Alternatively, the DPU devices 109 can execute workloads 130 assigned specifically to the DPU device 109 or to a virtual device that includes the hardware resources of a DPU device 109. In some examples, the management service 120 can communicate directly with the DPU management OS 165, and in other examples the management service 120 can use the management hypervisor 155 to communicate with the DPU management OS 165.

The host device 106 can include a management component 151. The management component 151 can communicate with the management service 120 for scheduling of workloads 130 executed using virtual resources that are mapped to the physical resources of one or more host device 106. The management component 151 can communicate with the management hypervisor 155 to deploy virtual devices that perform the of workloads 130. In various embodiments, the management component 151 can be separate from, or a component of, the management hypervisor 155. The management component 151 can additionally or alternatively be installed to the DPU device 109. The management component 151 of a DPU device 109 can be separate from, or a component of, the DPU management OS 165.

The host device 106 can include a management hypervisor installer 153, a management hypervisor 155, an installer server component 157, a baseboard management controller BMC 159, and a DPU management OS image capsule 161. The management hypervisor installer 153 can refer to one or more installation file, executable, or other program instructions that install the management hypervisor 155 on the host device 106. The management hypervisor installer 153 can be downloaded, otherwise transferred over a network 112, or provided using a physical medium attached to a physical connection to the host device 106.

The management hypervisor installer 153 can install the management hypervisor 155 to the host device 106. In some cases, the management hypervisor installer 153 can also install the management component 151 as a user mode or kernel mode application that works in concert with the management hypervisor 155. The management hypervisor installer 153 can include or temporarily install the installer server component 157. Generally, the management hypervisor installer 153 can communicate and work in concert with the BMC 159 to identify DPU devices 109 and orchestrate the delivery of the DPU management OS image capsule 161 to the DPU device 109.

The management hypervisor 155 can include a bare metal or type 1 hypervisor that can provide access to the physical memory, physical processors, physical data storage, and physical network resources of the host devices 106 to perform workloads 130. A management hypervisor 155 can create, configure, reconfigure, and remove virtual machines and other virtual devices on a host device 106. The management hypervisor 155 can also relay instructions from the management service 120 to the DPU management OS 165. In other cases, the management service 120 can communicate with the DPU management OS 165 directly. The management hypervisor 155 can identify that a workload 130 or a portion of a workload 130 includes instructions that can be executed using the DPU device 109, and can offload these instructions to the DPU device 109.

The installer server component 157 can be used by the management hypervisor installer 153, which is used as a server to serve the DPU management OS image capsule 161. The installer server component 157 can be executed using the host device 106, and can include an executable program that is part of the management hypervisor installer 153, installed by the management hypervisor installer 153, or otherwise used in concert with the management hypervisor installer 153 as a server to serve the DPU management OS image capsule 161.

The BMC 159 can include a specialized processor, chip, system-on-chip, or other hardware device used for remote monitoring and management of the host device 106. The BMC 159 can be part of the motherboard or baseboard of the host device 106. The BMC 159 can be accessed using a network connection. The BMC 159 can access the installer server component 157 using this network connection, although the BMC 159 can be considered part of the same host device 106 by being located on the motherboard.

The BMC 159 can include the ability to power off, power on, and otherwise power cycle the host device 106. The BMC 159 can include or use sensors to identify hardware and software configurations of the host device 106. For example, the BMC 159 can identify a list of all the DPU devices 109 installed to the host device 106. The BMC 159 can also include the ability to transmit commands to the DPU device 109 through the DPU UEFI 163. The commands can include a command to reset the DPU device 109. The DPU device 109, when reset, can transmit a request for pending firmware updates or capsules from the BMC 159. The BMC 159 can receive the request for pending firmware, and can return the URI for the DPU management OS image capsule 161, or can use the URI to retrieve the DPU management OS image capsule 161 from the installer server component 157.

A capsule can be a file or image formatted in a way that enables the DPU UEFI 163 to store it to a data store of the DPU device 109 for execution without a traditional installer or installation process. Generally, a capsule can be a format that can be used to install firmware updates to the DPU device 109. However, the management service 120 can partner with the DPU device 109 provider, and the DPU UEFI 163 can identify whether a capsule includes a format, identifier, or other parameter that indicates the capsule includes a DPU management OS 165 rather than a typical firmware update. For example, a capsule header of the capsule can include a field such as an Extensible Firmware Interface (EFI) Globally Unique Identifier (GUID) field that specifies an EFI GUID parameter value for the capsule. The DPU management OS image capsule 161 can specify a GUID or another parameter that differentiates it from other capsule types. The capsule header can also specify parameters including a header size, a set of header flags, a capsule image size, and a 32 bit or other Cyclic Redundancy Check (CRC32) in corresponding fields. The DPU UEFI 163 can use the GUID parameter to identify that the DPU management OS image capsule 161 includes a DPU management OS 165. The DPU UEFI 163 can use the other parameters to ensure that the image is the proper size. The DPU UEFI 163 can also verify signatures of the individual binaries in the capsule before writing and booting the DPU management OS 165.

The DPU management OS image capsule 161 can be a specially prepared capsule that can be blasted or stored directly to the storage of the DPU device 109. The DPU management OS image capsule 161 can include a DPU management OS 165 image or OS code that can be mounted and executed without performing an installation process. While the discussion generally refers to an initial provisioning of the DPU management OS 165 without a full traditional installer, the process can also be used to provide automatic updates to the DPU management OS 165 on each reboot or reset of the DPU device 109. In that example, the server component can be launched by, or can be part of, the management component 151 or the management hypervisor 155. The management service 120 can transmit a command to update the OS, and the management component 151 or the management hypervisor 155 can launch the server component, and can perform the other steps and actions discussed as performed by the management hypervisor installer 153.

The DPU device 109 can include a DPU UEFI 163 and the DPU management OS 165. The DPU UEFI 163 of the DPU device 109 can include preinstalled, such as factory installed, manufacturer installed, or supplier installed instructions that identify that the DPU management OS image capsule 161 includes the DPU management OS 165. The DPU UEFI 163 can then flash the DPU management OS 165 image of the DPU management OS image capsule 161 directly to an internal memory or data store of the DPU device 109, and configure boot options and boot order to boot to the DPU management OS 165. The internal memory or data store of the DPU device 109 can include an Embedded MultiMediaCard (eMMC), a solid-state memory, a flash memory, or another non-volatile memory.

The DPU management OS 165 can be a management-service-specific operating system that enables the management service 120 to manage the DPU device 109 and assign workloads 130 to execute using its resources. The DPU management OS 165 can communicate with the management hypervisor 155 and/or with the management service 120 directly to provide access to the physical memory, physical processors, physical data storage, physical network resources, and physical accelerator resources of the DPU devices 109. However, the DPU management OS 165, or an up-to-date version of the DPU management OS 165 may not be initially installed to the DPU device 109. In some cases, since the DPU devices 109 can vary in form and function, DPU management OS 165 can be DPU-device-type specific for a device type such as a manufacturer, product line, or model type of a DPU device 109.

Figure 2:
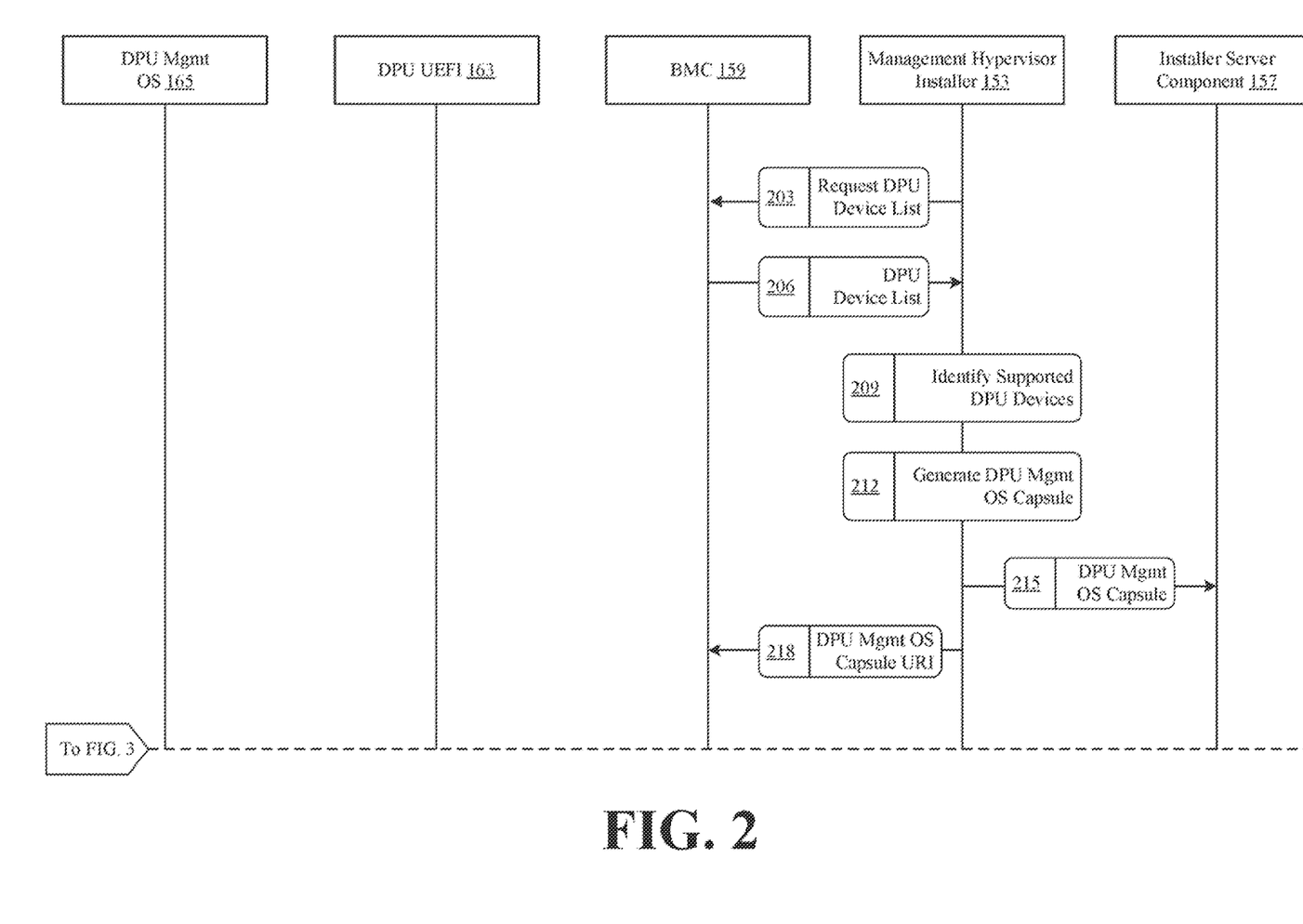
FIG. 2 is a sequence diagram that provides an example of the operation of components of the networked environment of FIG. 1, according to the present disclosure.

FIG. 2 is a sequence diagram that provides an example of the operation of components of the networked environment 100 to provision a DPU device 109 with a DPU management OS 165 using capsules. While a particular step can be discussed as being performed by a particular hardware or software component of the networked environment 100, other components can perform aspects of that step. Generally, this figure shows how the management hypervisor installer 153 guides a process to provision the DPU device 109 with the DPU management OS 165.

In step 203, the management hypervisor installer 153 can request a DPU device list from the BMC 159. The management hypervisor installer 153 can transmit a request or command that causes the BMC 159 to return a DPU device list. The BMC 159 can maintain the list based on periodic updates, or can identify all DPU devices 109 and create the list in response to the request.

In step 206, the management hypervisor installer 153 can receive the DPU device list from the BMC 159. The DPU device list or other data structure can include and specify information about one or more than one DPU device 109. The information can include a DPU device identifier of each DPU device 109, a DPU type such as a manufacturer and model number of the DPU device 109, and other data.

In step 209, the management hypervisor installer 153 can identify supported accelerators or DPU devices 109 from the list. The management hypervisor installer 153 can then generate a user interface that identifies the DPU devices 109 and obtains a user indication to copy the DPU management OS 165 to the supported DPU devices 109. While the discussion can refer to a particular DPU device 109, the process can be repeated sequentially, simultaneously, or with partial concurrence for all supported DPU devices 109.

The management hypervisor installer 153 can maintain a list or other data structure that indicates DPU types that are supported by the management hypervisor 155 and for which a DPU management OS 165 image is available and configurable. In some examples, the management hypervisor installer 153 can include one or more DPU management OS images. Since a DPU device 109 can be a specialized hardware device, a different DPU management OS 165 can be used for each supported DPU device type.

The DPU management OS 165 image can include a partitioned raw disk image that includes an EFI System Partition, boot banks, and so on. This can include a preinstalled image, for example, in a .dd format or another format. The preinstalled image can be considered preinstalled since it does not require an installation process to be executed by the DPU device 109. The preinstalled image can be wrapped in a management-service-specific OS capsule. A manufacturer of the DPU device 109, or a provider of the DPU UEFI 163 can partner with the management service 120 so that the DPU UEFI 163 can identify that a capsule includes a DPU management OS 165. The management-service-specific OS capsule can include a capsule header that specifies an EFI GUID parameter or another parameter that can be used to identify that the capsule is an operating system capsule type or management operating system capsule type.

In step 212, the management hypervisor installer 153 can generate a DPU management OS image capsule 161. The management hypervisor installer 153 can identify a DPU management OS 165 image for the DPU device type of the DPU device 109. The management hypervisor installer 153 can also identify a configuration for the DPU management OS 165 image and modify the DPU management OS 165 image to include the configuration for the DPU management OS 165 of the image. The configuration can be identified based on the DPU device type of the DPU device 109, or can be identified based on other parameters of the host device 106 or a user of the host device 106. The management hypervisor installer 153 can wrap the DPU management OS 165 image in a management-service-specific OS capsule that includes a parameter that indicates that the capsule includes a DPU management OS 165. In other words, the parameter can identify the capsule as a DPU management OS image capsule 161. The parameter can be an EFI GUID parameter that specifies a particular GUID that is associated with the DPU management OS 165.

In step 215, the management hypervisor installer 153 can provide or transmit the DPU management OS image capsule 161 to the installer server component 157. The management hypervisor installer 153 or the installer server component 157 can store the DPU management OS image capsule 161 locally to a data store of the host device 106. The management hypervisor installer 153 or the installer server component 157 can then generate a URI through which the DPU management OS image capsule 161 can be accessed over a network internal to the host device 106. In some examples, the management hypervisor installer 153 can transmit this DPU management OS capsule URI to the management hypervisor installer 153.

In step 218, the management hypervisor installer 153 can transmit the DPU management OS capsule URI to the BMC 159. This transmission can identify the URI as a firmware URI for a firmware update for the DPU device 109. The URI can be transmitted along with an identifier of the DPU device 109 and an indication that the URI is for the firmware update. The BMC 159 can store the DPU management OS capsule URI. The process can then move to FIG. 3.

Figure 3:
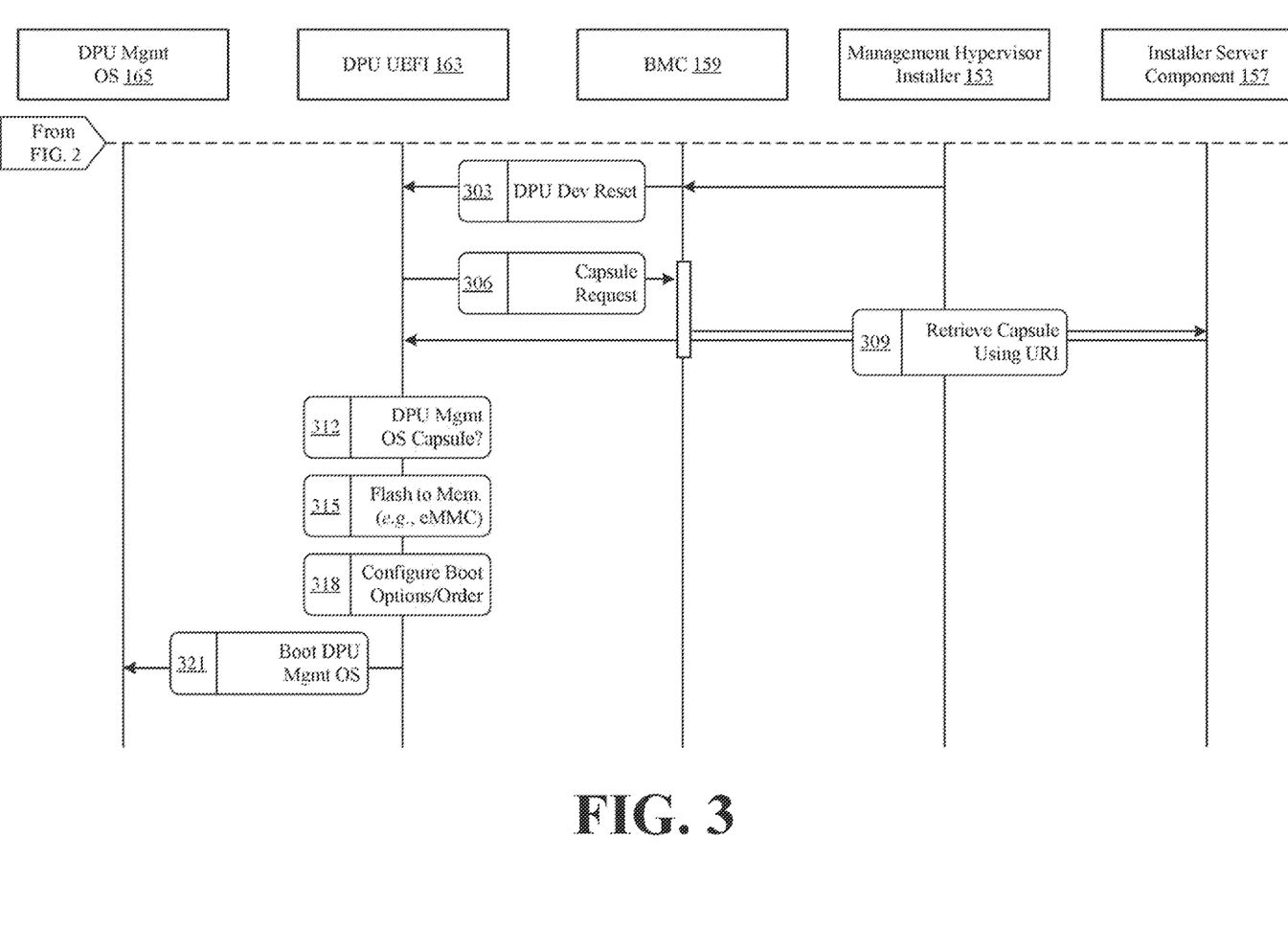
FIG. 3 is a sequence diagram that continues the example of FIG. 2, according to the present disclosure.

FIG. 3 is a sequence diagram that provides an example of the operation of components of the networked environment 100 to provision a DPU device 109 with a DPU management OS 165 using capsules. While a particular step can be discussed as being performed by a particular hardware or software component of the networked environment 100, other components can perform aspects of that step. Generally, this figure continues the example of FIG. 2.

In step 303, the BMC 159 can reset the DPU device 109. The BMC 159 can transmit a command to the DPU device 109 that causes the DPU device 109 to reset. In some examples, the management hypervisor installer 153 can use the BMC 159 to reset the DPU device 109. The management hypervisor installer 153 can transmit a command to the BMC 159 that instructs the BMC 159 to reset the DPU device 109.

In step 306, the BMC 159 can receive a request for pending capsules, or a request for firmware updates from the DPU UEFI 163 of the DPU device 109. This can be part of a startup process of the DPU device 109. In some examples, the request can specify an identifier of the DPU device 109, and the BMC 159 can identify pending capsules based on the identifier. If a pending capsule is available, the BMC 159 can return an indication that there is a pending capsule available. In some cases, the DPU UEFI 163 of the DPU device 109 can provide a separate capsule request that instructs the BMC 159 to retrieve and relay the DPU management OS 165 image capsule 161 from the installer server component 157. Otherwise the process can proceed without further instruction from the DPU UEFI 163.

In step 309, the BMC 159 can retrieve and relay the DPU management OS image capsule 161 from the installer server component 157. The BMC 159 can use the URI that was provided by the management hypervisor installer 153 to access the DPU management OS image capsule 161. The BMC 159 can temporarily store the DPU management OS image capsule 161. Alternatively, the BMC 159 can stream the DPU management OS image capsule 161 to the DPU device 109 without storing it.

In step 312, the DPU UEFI 163 can identify whether the received DPU management OS image capsule 161 includes a DPU management OS 165. For example, the DPU UEFI 163 can verify that the received DPU management OS image capsule 161 includes a parameter or indication that identifies it to include a DPU management OS 165. The DPU UEFI 163 can include a specific component or mechanism that can identify whether the received DPU management OS image capsule 161 includes a DPU management OS 165 based on a parameter specified in the capsule wrapper, by parsing another portion of the capsule that includes the DPU management OS 165.

In step 315, the DPU UEFI 163 can flash the DPU management OS image capsule 161 directly to memory such as an eMMC or another memory of the DPU device 109. In some cases, the DPU UEFI 163 can flash the DPU management OS 165 image of the capsule to a memory address of the DPU device 109 that is reserved or specified for operating systems generally, or for the DPU management OS 165 specifically. In other words, this writing operation can overwrite an existing or manufacturer-provided DPU OS, or can store the DPU management OS 165 in another predetermined location or address. The contents of the DPU management OS image capsule 161 can be written byte-by-byte, without the capsule header, to a predetermined identified local storage medium and memory location specified by the vendor, manufacturer, or provider of the DPU device 109. If the DPU device 109 has a local nonvolatile memory express (NVMe) drive, the DPU management OS 165 image can be written to the local NVMe drive. Otherwise, image data can be written to eMMC.

In step 318, the DPU UEFI 163 can configure boot options and order of the DPU device 109 to boot to the DPU management OS 165. For example, the DPU UEFI 163 can configure the boot order so that the DPU management OS 165 is listed first in the boot order. The boot options and order can include a set of options and order that are pre-stored as part of the DPU UEFI 163. The boot options and order can include a set of options and orders that are indicated as a parameter received in the DPU management OS image capsule 161 or capsule header.

In step 321, the DPU UEFI 163 can instruct the DPU device 109 boot to the DPU management OS 165. In some examples, the DPU UEFI 163 can reboot the DPU device 109 once the boot options and order of the DPU device 109 are set to boot to the DPU management OS 165. The DPU management OS 165 can initialize and transmit an indication to the BMC 159 that it is initialized and running. The BMC 159 can transmit an indication to the management hypervisor installer 153 that the provisioning of the DPU management OS 165 is completed, and the management Hypervisor installer 153 can stop executing the installer server component 157.

Figure 4:
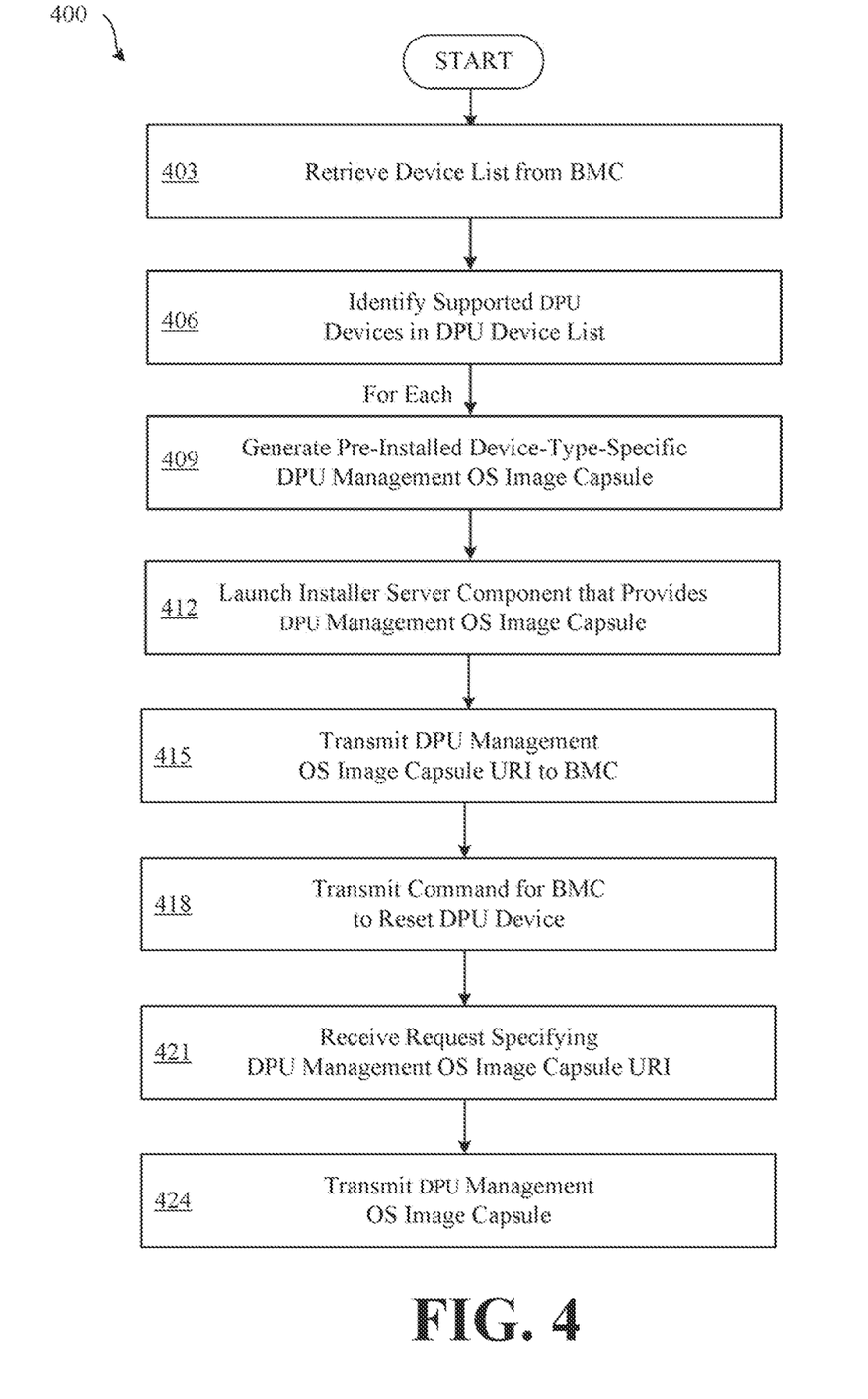
FIG. 4 is a flowchart illustrating functionality implemented by components of the networked environment, according to the present disclosure.

FIG. 4 shows a flowchart 400 that provides an example of the operation of components of the networked environment 100 to provision a DPU device 109 with a DPU management OS 165 using capsules. While a particular step can be discussed as being performed by a particular hardware or software component of the networked environment 100, other components can perform aspects of that step. Generally, this figure shows how the management hypervisor installer 153 guides a process to provision the DPU device 109 with the DPU management OS 165.

In step 403, the management hypervisor installer 153 can retrieve a DPU device list from the BMC 159. The management hypervisor installer 153 can transmit a request or command that causes the BMC 159 to return a DPU device list. The BMC 159 can maintain the list based on periodic updates, or can identify all DPU devices 109 and create the list in response to the request.

The management hypervisor installer 153 can receive the DPU device list from the BMC 159. The DPU device list or other data structure can include and specify information about one or more than one DPU device 109. The information can include a DPU device identifier of each DPU device 109, a DPU type such as a manufacturer and model number of the DPU device 109, and other data.

In step 406, the management hypervisor installer 153 can identify supported accelerator or DPU devices 109 from the DPU device list. The management hypervisor installer 153 can maintain a list or other data structure that indicates DPU types that are supported by the management hypervisor 155 and for which a DPU management OS 165 image is available and configurable. The DPU management OS 165 image can include a partitioned raw disk image that includes an EFI System Partition, boot banks, and so on.

The preinstalled image can be wrapped in a management-service-specific OS capsule. A manufacturer of the DPU device 109, or a provider of the DPU UEFI 163 can partner with the management service 120 so that the DPU UEFI 163 can identify that a capsule includes a DPU management OS 165.

In step 409, the management hypervisor installer 153 can generate a DPU management OS image capsule 161. The management hypervisor installer 153 can identify a DPU management OS 165 image for the DPU device type of the DPU device 109. The management hypervisor installer 153 can also identify a configuration for the DPU management OS 165 image and modify the DPU management OS 165 image to include the configuration for the DPU management OS 165 of the image. The configuration can be identified based on the DPU device type of the DPU device 109, or can be identified based on other parameters of the host device 106 or a user of the host device 106. The management hypervisor installer 153 can wrap the DPU management OS 165 image in a management-service-specific OS capsule that includes a parameter that indicates that the capsule includes a DPU management OS 165. In other words, the parameter can identify the capsule as a DPU management OS image capsule 161.

In step 412, the management hypervisor installer 153 can launch or execute the installer server component 157. The installer server component 157 can be preconfigured to provide the DPU management OS image capsule 161 at a particular URI. The URI can be a predetermined URI that is included or generated using the management hypervisor installer 153. Alternatively, the installer server component 157 can generate the URI and provide it back to the management hypervisor installer 153.

The management hypervisor installer 153 or the installer server component 157 can store the DPU management OS image capsule 161 locally to a data store of the host device 106. The management hypervisor installer 153 or the installer server component 157 can then generate a URI through which the DPU management OS image capsule 161 can be accessed over a network internal to the host device 106. In some examples, the management hypervisor installer 153 can transmit this DPU management OS capsule URI to the management hypervisor installer 153.

In step 415, the management hypervisor installer 153 can transmit the DPU management OS capsule URI to the BMC 159. This transmission can identify the URI as a firmware URI for a firmware update for the DPU device 109. The URI can be transmitted along with an identifier of the DPU device 109 and an indication that the URI is for the firmware update. The BMC 159 can store the DPU management OS capsule URI.

In step 418, the management hypervisor installer 153 can transmit a command to the BMC 159 that instructs the BMC 159 to reset the DPU device 109. The BMC 159 can reset the DPU device 109. The BMC 159 can transmit a command to the DPU device 109 that causes the DPU device 109 to reset.

In step 421, the installer server component 157 of the management hypervisor installer 153 can receive a request for the DPU management OS image capsule 161. The request can specify the DPU management OS image capsule 161 URI. The request can be received from the BMC 159.

In step 424, the installer server component 157 can serve up the DPU management OS image capsule 161 based on the request. In some cases, the BMC 159 can download and temporarily store the DPU management OS image capsule 161, and can then provide it to the DPU device 109.

Alternatively, the BMC 159 can stream the DPU management OS image capsule 161 to the DPU device 109 without storing it.

The DPU UEFI 163 can flash the DPU management OS 165 image to a memory of the DPU device, set the boot order and options, and boot to the DPU management OS 165. The DPU management OS 165 can execute and transmit an indication to the BMC 159 that it is initialized. The BMC 159 can transmit an indication to the management hypervisor installer 153 that the provisioning of the DPU management OS 165 is completed. The management hypervisor installer 153 can instruct the installer server component 157 to stop serving the DPU management OS image capsule 161 and delete it from a memory of the host device 106. The management hypervisor installer 153 can also stop execution of the installer server component 157.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory devices can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Although the various services and functions described herein can be embodied in software or code executed by general purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagrams and flowcharts can show examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although sequence diagrams and flowcharts can be shown in a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included in the following claims herein, within the scope of this disclosure.

What is claimed is:

1. A non-transitory computer-readable medium comprising executable instructions, wherein the instructions, when executed by at least one processor, cause at least one computing device to at least:

receive, by a management hypervisor installer executed on a host device from a baseboard management controller (BMC) of the host device, a listing of at least one data processing unit (DPU) device physically installed to the host device;

generate, by the management hypervisor installer, a preinstalled DPU management operating system image identified for a DPU device from the listing;

wrap, by the management hypervisor installer, the preinstalled DPU management operating system image with a capsule that specifies a parameter that identifies the capsule as a DPU management operating system image capsule;

launch, by the management hypervisor installer, a server component that provides the DPU management operating system image capsule at a particular uniform resource identifier (URI) accessible over a network internal to the host device; and transmit, by the management hypervisor installer, the particular URI to the BMC of the host device, wherein the BMC transfers the DPU management operating system image capsule to the DPU device.

2. The non-transitory computer-readable medium of claim 1, wherein the instructions, when executed by the at least one processor, cause the at least one computing device to at least:

identify the DPU device from the listing based at least in part on a DPU device type or model number specified for the DPU device in the listing.

3. The non-transitory computer-readable medium of claim 1, wherein the instructions, when executed by the at least one processor, cause the at least one computing device to at least:

receive, by the management hypervisor installer, an indication that a DPU management operating system is executing on the DPU device, wherein the DPU management operating system is executed using the preinstalled DPU management operating system image.

4. The non-transitory computer-readable medium of claim 3, wherein the instructions, when executed by the at least one processor, cause the at least one computing device to at least:

halt, by the management hypervisor installer, execution of the server component based at least in part on the indication that the DPU management operating system is executing on the DPU device.

5. The non-transitory computer-readable medium of claim 1, wherein the preinstalled DPU management operating system image is an image of a DPU management operating system that is executable by the DPU device once written directly to a memory of the DPU device.

6. The non-transitory computer-readable medium of claim 1, wherein the DPU management operating system image capsule comprises a capsule header comprising the parameter that identifies the capsule as the DPU management operating system image capsule.

7. The non-transitory computer-readable medium of claim 6, wherein the parameter is a Globally Unique Identifier (GUID) of a DPU management operating system specified in an Extensible Firmware Interface (EFI) field of the capsule header.

8. A system, comprising:
at least one computing device comprising at least one processor; and
a data store comprising executable instructions, wherein the instructions, when executed by the at least one processor, cause the at least one computing device to at least:

receive, by a management hypervisor installer executed on a host device from a baseboard management controller (BMC) of the host device, a listing of at least one data processing unit (DPU) device physically installed to the host device;

generate, by the management hypervisor installer, a preinstalled DPU management operating system image identified for a DPU device from the listing;

wrap, by the management hypervisor installer, the preinstalled DPU management operating system image with a capsule that specifies a parameter that identifies the capsule as a DPU management operating system image capsule;

launch, by the management hypervisor installer, a server component that provides the DPU management operating system image capsule at a particular uniform resource identifier (URI) accessible over a network internal to the host device; and transmit, by the management hypervisor installer, the particular URI to the BMC of the host device, wherein the BMC transfers the DPU management operating system image capsule to the DPU device.

9. The system of claim 8, wherein the instructions, when executed by the at least one processor, cause the at least one computing device to at least:

identify the DPU device from the listing based at least in part on a DPU device type or model number specified for the DPU device in the listing.

10. The system of claim 8, wherein the instructions, when executed by the at least one processor, cause the at least one computing device to at least:

receive, by the management hypervisor installer, an indication that a DPU management operating system is executing on the DPU device, wherein the DPU management operating system is executed using the preinstalled DPU management operating system image.

11. The system of claim 10, wherein the instructions, when executed by the at least one processor, cause the at least one computing device to at least:

halt, by the management hypervisor installer, execution of the server component based at least in part on the indication that the DPU management operating system is executing on the DPU device.

12. The system of claim 8, wherein the preinstalled DPU management operating system image is an image of a DPU management operating system that is executable by the DPU device once written directly to a memory of the DPU device.

13. The system of claim 8, wherein the DPU management operating system image capsule comprises a capsule header comprising the parameter that identifies the capsule as the DPU management operating system image capsule.

14. The system of claim 13, wherein the parameter is a Globally Unique Identifier (GUID) of a DPU management operating system specified in an Extensible Firmware Interface (EFI) field of the capsule header.

15. A method, comprising:
receiving, by a management hypervisor installer executed on a host device from a baseboard management controller (BMC) of the host device, a listing of at least one data processing unit (DPU) device physically installed to the host device;

generating, by the management hypervisor installer, a preinstalled DPU management operating system image identified for a DPU device from the listing;

wrapping, by the management hypervisor installer, the preinstalled DPU management operating system image with a capsule that specifies a parameter that identifies the capsule as a DPU management operating system image capsule;

launching, by the management hypervisor installer, a server component that provides the DPU management operating system image capsule at a particular uniform resource identifier (URI) accessible over a network internal to the host device; and transmitting, by the management hypervisor installer, the particular URI to the BMC of the host device, wherein the BMC transfers the DPU management operating system image capsule to the DPU device.

16. The method of claim 15, further comprising:
identifying the DPU device from the listing based at least in part on a DPU device type or model number specified for the DPU device in the listing.

17. The method of claim 15, further comprising:
receiving, by the management hypervisor installer, an indication that a DPU management operating system is executing on the DPU device, wherein the DPU management operating system is executed using the preinstalled DPU management operating system image.

18. The method of claim 15, further comprising:
halting, by the management hypervisor installer, execution of the server component based at least in part on an indication that a DPU management operating system is executing on the DPU device.

19. The method of claim 18, wherein the preinstalled DPU management operating system image is an image of the DPU management operating system that is executable by the DPU device once written directly to a memory of the DPU device.

20. The method of claim 15, wherein the DPU management operating system image capsule comprises a capsule header comprising the parameter that identifies the capsule as the DPU management operating system image capsule.

* * * * *